(12) United States Patent
Klein et al.

(10) Patent No.: US 11,616,590 B2
(45) Date of Patent: Mar. 28, 2023

(54) SYSTEM COMPRISING MULTIPLE UNITS

(71) Applicant: NXP B.V., Eindhoven (NL)

(72) Inventors: Martin Klein, Hamburg (DE); Martin Kessel, Bannewitz (DE); Sebastian Bohn, Dresden (DE); Manfred Zupke, Hamburg (DE); Evert-Jan Pol, Valkensward (NL); Hendrik van der Ploeg, Waalre (NL); Andreas Johannes Gerrits, Oeffelt (NL); Prince Thomas, Bangalore (IN)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 17/643,096

(22) Filed: Dec. 7, 2021

(65) Prior Publication Data

US 2022/0200718 A1 Jun. 23, 2022

(30) Foreign Application Priority Data

Dec. 18, 2020 (IN) .............................. 202011055248

(51) Int. Cl.
*H04J 3/06* (2006.01)
*H04W 56/00* (2009.01)
(52) U.S. Cl.
CPC ............ *H04J 3/067* (2013.01); *H04J 3/0647* (2013.01); *H04J 3/0655* (2013.01); *H04J 3/0661* (2013.01); *H04W 56/0015* (2013.01)
(58) Field of Classification Search
CPC ........ H04J 3/067; H04J 3/0647; H04J 3/0655; H04J 3/0685; H04J 3/0641; H04J 3/0661;
(Continued)

(56) References Cited

U.S. PATENT DOCUMENTS 10,257,825 B2 4/2019 Gan et al.
RE48,757 E * 9/2021 Fischer ................ H04B 7/2606
(Continued)

OTHER PUBLICATIONS

Huckeba et al, "Precise Time Synchronization Using IEEE 1588 for LXI Applications", 2006, IEEE (Year: 2006).*

(Continued)

*Primary Examiner* — Omer S Mian

(57) ABSTRACT

A system (100) comprising: a first unit (104) and one or more second units (104). The first unit (102) comprises: a timing reference (114) configured to provide a master-timing-reference-signal; a master time block configured to provide a master-time-signal (117) for the first unit (102) based on the master-timing-reference-signal; and a first interface (122) configured to: receive timestamped-processed-second-RF-signals from the one or more second units (104); and provide a first-unit-timing-signal (262) to the one or more second units (104) based on the master-time-signal. The one or more second units (104) each comprise: a slave time block (141) configured to: determine a slave-time-signal (142) for the second unit (104) based on the master-timing-reference-signal; determine one or more second-timing-values based on the slave-time-signal; determine an adjustment-time based on the first-unit-timing-signal received from the first unit (102) and the second-timing-values; and adjust the slave-time-signal based on the adjustment-time.

19 Claims, 4 Drawing Sheets

(58) Field of Classification Search
CPC ........................ H04W 56/0015; H04B 1/0007; H04B 7/0404
See application file for complete search history.

(56) References Cited

U.S. PATENT DOCUMENTS

| | | |
|---|---|---|
| 2014/0211779 A1 | 7/2014 | Rogalin et al. |
| 2015/0003550 A1* | 1/2015 | Koppelaar .......... H04W 88/085 375/267 |
| 2019/0356366 A1* | 11/2019 | van Meurs ........ H04W 56/0015 |
| 2020/0092024 A1 | 3/2020 | Williams et al. |

OTHER PUBLICATIONS

Smith, "Network-Based Timing, Genlock and Time Code: Using Precision Time Protocol", SMPTE, 2015 (Year: 2015).*

Ferrant et al, "Development of the First IEEE 1588 Telecom Profile to Address Mobile Backhaul Needs", 2010, IEEE (Year: IEEE) (Year: IEEE).*

Stanton, K., "Software Access to Precise Time for Industrial, Automotive, A/V [Etc.] Requirements and Approach", ITSF Global Conference on Timing and Synchronisation Across Networks, Nov. 2016.

* cited by examiner

SYSTEM COMPRISING MULTIPLE UNITS

CROSS-REFERENCE TO RELATED APPLICATIONS

This application claims the priority under 35 U.S.C. § 119 of European Patent application no. 202011055248, filed on 18 Dec. 2020, the contents of which are incorporated by reference herein.

FIELD

The present disclosure relates to a system having multiple units, each unit having an antenna. Such systems can be used to apply phase diversity schemes in some, but not necessarily all, examples.

SUMMARY

According to a first aspect of the present disclosure there is provided a system comprising:
   a first unit; and
   one or more second units;
wherein the first unit comprises:
   a first-antenna configured to receive a first RF signal;
   a first signal processing block configured to process the first RF signal in order to provide a processed-first-RF-signal;
   a timing reference configured to provide a master-timing-reference-signal;
   a master time block configured to provide a master-time-signal for the first unit based on the master-timing-reference-signal;
   a first timestamp processor configured to apply a timestamp to the processed-first-RF-signal based on the master-time-signal, in order to provide a timestamped-processed-first-RF-signal;
   a first interface configured to:
      receive timestamped-processed-second-RF-signals from the one or more second units; and
      provide a first-unit-timing-signal to the one or more second units based on the master-time-signal;
wherein the one or more second units each comprise:
   a second-antenna configured to receive a second RF signal;
   a second signal processing block configured to process the second RF signal in order to provide a processed-second-RF-signal;
   a slave time block configured to:
      receive the master-timing-reference-signal;
      determine a slave-time-signal for the second unit based on the master-timing-reference-signal;
      determine one or more second-timing-values based on the slave-time-signal;
      determine an adjustment-time based on the first-unit-timing-signal received from the first unit and the second-timing-values; and
      adjust the slave-time-signal based on the adjustment-time;
   a second timestamp processor configured to apply a timestamp to the processed-second-RF-signal based on the slave-time-signal, in order to provide a timestamped-processed-second-RF-signal; and
   a second interface configured to:
      provide the timestamped-processed-second-RF-signal to the first unit; and
      receive the first-unit-timing-signal from the first unit;
wherein the system is configured to provide the timestamped-processed-first-RF-signal and the timestamped-processed-second-RF-signals from the one or more second units for further processing.

Advantageously such a system can utilise a shared reference signal (the master-timing-reference-signal) to process time aligned samples, and can provide timestamped-processed-RF-signals that are sufficiently well aligned to enable precision time information exchange.

In one or more embodiments the system further comprises a processor that is configured to combine the timestamped-processed-first-RF-signal and the time stamped-processed-second-RF-signals from the one or more second units in order to provide a combined-RF-signal.

In one or more embodiments the processor is a baseband processor.

In one or more embodiments the processor is configured to combine the timestamped-processed-first-RF-signal and the timestamped-processed-second-RF-signals from the one or more second units in order to provide a combined-RF-signal using phase diversity.

In one or more embodiments the slave time block is configured to determine the one or more second-timing-values by: storing the value of the slave-time-signal when the second unit sends a request-signal to the first unit; and/or storing the value of the slave-time-signal when the second unit receives the first-unit-timing-signal from the first unit.

In one or more embodiments the first-unit-timing-signal comprises one or more first-timing-values that include one or both of: the value of the master-time-signal when an earlier request-signal was received from the one or more second units; and the value of the master-time-signal when the first unit transmitted an earlier first-unit-timing-signal to the one or more second units.

In one or more embodiments the slave time block is configured to add/subtract the adjustment-time to/from the master-timing-reference-signal in order to adjust the slave-time-signal.

In one or more embodiments the first-unit-timing-signal that is provided by the first unit comprises:
   t2, which is the value of the master-time-signal at the time (t2) that an earlier request-signal was received from the one or more second units; and/or
   t3, which is the value of the master-time-signal at the time (t3) when the first unit transmitted an earlier first-unit-timing-signal to the one or more second units.

In one or more embodiments each of the one or more second units is configured to:
   store t1 as a second-timing-value, wherein t1 is the value of the slave-time-signal at the time when the second unit transmitted the earlier request-signal; and/or
   store t4 as a second-timing-value, wherein t4 is the value of the slave-time-signal at the time when the second unit received the earlier first-unit-timing-signal from the first unit.

The slave-time-block may be configured to determine the adjustment-time based on one or more of t1, t2, t3 and t4.

In one or more embodiments the first and second interfaces are high-speed interfaces. The high-speed interfaces may be standard high-speed interfaces.

In one or more embodiments:
   the first unit comprises a time alignment block that is configured to adjust the processed-first-RF-signal using the master-time-signal to perform sub-sample time alignment; and/or the second unit comprises a time alignment block that is configured to adjust the processed-second-RF-signal using the slave-time-signal to perform sub-sample time alignment.

In one or more embodiments:
the first timestamp processor is configured to apply the timestamp to the processed-first-RF-signal as metadata; and/or
the second timestamp processor is configured to apply the timestamp to the processed-second-RF-signal as metadata.

In one or more embodiments the master-timing-reference-signal has a maximum deviation from a target frequency/time period of +/−50 ppm.

In one or more embodiments the master-time-signal and the slave-time-signal have the same resolution.

In one or more embodiments the first signal processing block and the second signal processing block each comprise an ADC such that the processed-first-RF-signal and the processed-second-RF-signal are digital signals.

According to a further aspect of the present disclosure, there is provided a method comprising:

in relation to a first unit:
receiving a first RF signal;
processing the first RF signal in order to provide a processed-first-RF-signal;
a timing reference providing a master-timing-reference-signal;
providing a master-time-signal for the first unit based on the master-timing-reference-signal;
applying a timestamp to the processed-first-RF-signal based on the master-time-signal, in order to provide a timestamped-processed-first-RF-signal;
receiving timestamped-processed-second-RF-signals from the one or more second units; and
providing a first-unit-timing-signal to the one or more second units based on the master-time-signal;

in relation to one or more second units:
receiving a second RF signal;
processing the second RF signal in order to provide a processed-second-RF-signal;
receiving the master-timing-reference-signal;
determining a slave-time-signal for the second unit based on the master-timing-reference-signal;
determining one or more second-timing-values based on the slave-time-signal;
determining an adjustment-time based on the first-unit-timing-signal received from the first unit and the second-timing-values; and
adjusting the slave-time-signal based on the adjustment-time;
applying a timestamp to the processed-second-RF-signal based on the slave-time-signal, in order to provide a timestamped-processed-second-RF-signal;
providing the timestamped-processed-second-RF-signal to the first unit; and
receiving the first-unit-timing-signal from the first unit;

the method further comprising:
providing the timestamped-processed-first-RF-signal and the timestamped-processed-second-RF-signals from the one or more second units for further processing.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Examples of the present disclosure relates to use of High-Speed Interface Based Sampling Time Alignment that can be used for Phase Diversity Systems. Advantageously, such examples can establish a reliable real-time sub-sample and sample alignment in a radio frequency broadcast system application, although examples disclosed herein are not limited to such applications. Such examples can be considered as synchronized pre-processing systems that can be used to enable subsequent baseband processing for combining digitized signals from two different antennas.

Figure 1:
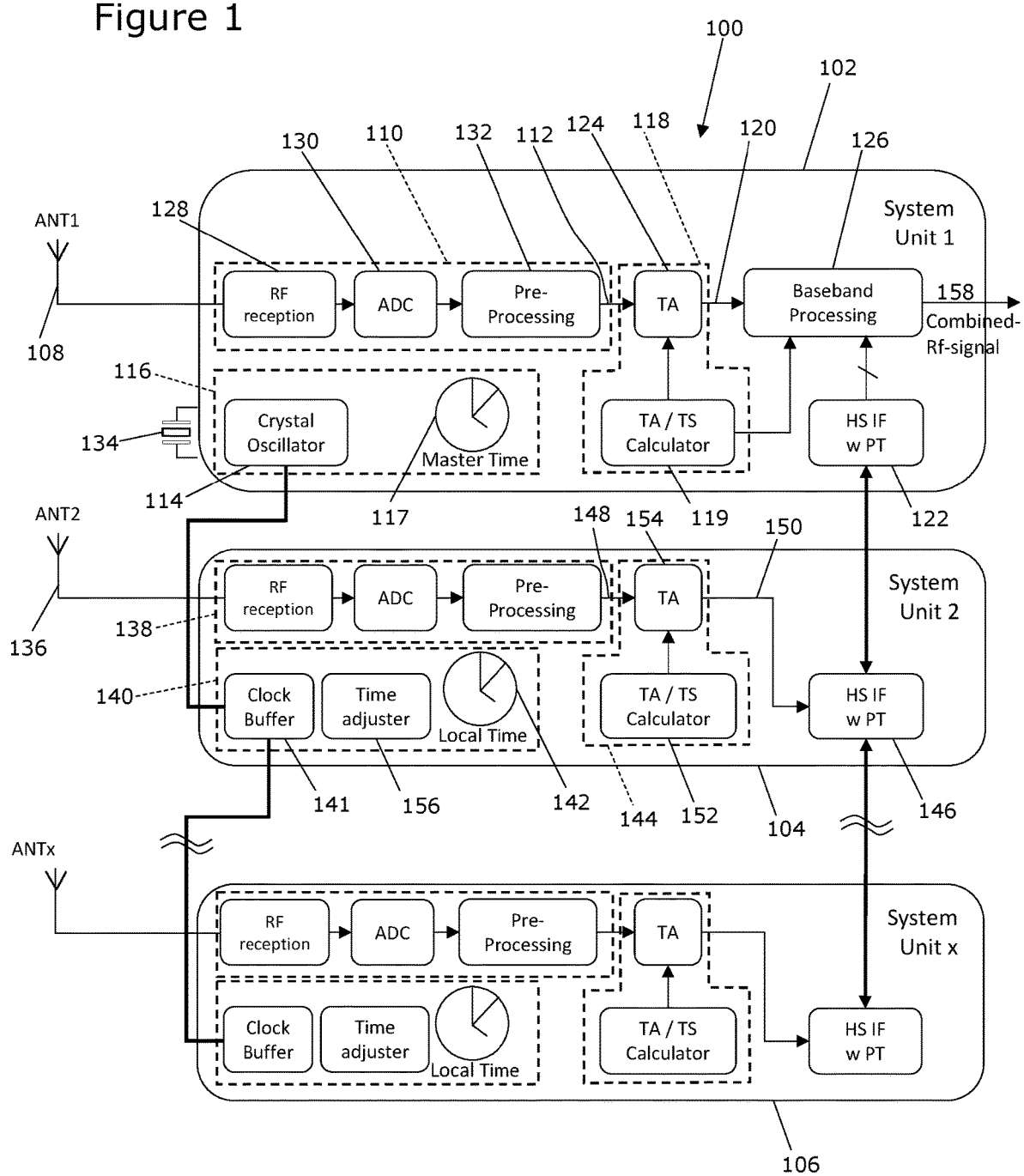
FIG. 1 shows an example embodiment of a system that includes a first unit and one or more second units.

FIG. 1 shows an example embodiment of a system 100 that includes a first unit 102 and one or more second units 104, 106. In this example there are two second units 104, 106 although it will be appreciated that in other examples there could be any number of second units. As will be discussed in detail below, each of the units 102, 104, 106 has an antenna for receiving a signal. In one application these antennas can be located at different locations on a car, and can be for receiving FM radio signals. The use of such a plurality of antennas can be beneficial if the signal received at one or more of the antennas is weak yet the signal received at another of the antennas is strong. In which case, an antenna diversity scheme can be employed to achieve reliable signal reception with acceptable quality.

The first unit 102 includes a first-antenna 108 that receives a first radio frequency (RF) signal. The first-antenna 108 is connected to a first signal processing block 110 such that the first signal processing block 110 processes the first RF signal in order to provide a processed-first-RF-signal 112. The processed-first-RF-signal 112 can include a sequence of packets/symbols that are received at the first-antenna 108. In this example, the first signal processing block 110 includes a RF reception chain 128, an RF analogue to digital converter (ADC) and a pre-processing block 132. It will be appreciated that the functionality required by the first signal processing block 110 will depend on the application of the system 100, and therefore that the components that are included in the first signal processing block 110 can be selected accordingly. In examples where the first signal processing block 110 includes an ADC, the processed-first-RF-signal 112 can be a digital signal.

The first unit 102 also includes a timing reference, which provides a master-timing-reference-signal. The master-timing-reference-signal can be very accurate and have a high frequency, and therefore the timing reference can also be considered as a precise timing reference. If the master timing reference-signal is based on a crystal oscillator the accuracy/max. deviation from a target frequency/time period can be=+/−50 ppm (parts per million) including aging/temperature drift/manufacturing tolerance.

In this example the timing reference is provided as an oscillator 114, in this example a crystal oscillator. The oscillator 114 is connected to an external crystal 134. The oscillator 114 provides a master-oscillator-signal (which is an example of a master-timing-reference-signal), which, as will be discussed below, is used by the first unit 102 and also each of the second units 104, 106.

The first unit 102 includes a master time block 116 that provides a master-time-signal for the first unit 102 based on the master-oscillator-signal that is provided by the oscillator 114. The master-time-signal is illustrated schematically in FIG. 1 with reference 117, and is used by various blocks/modules of the first unit 102, including for setting timestamps associated with the time at which signals are received at, or transmitted from, the first unit 102.

A first timestamp processor 118 is also included as part of the first unit 102. The first timestamp processor 118 can apply a timestamp to the processed-first-RF-signal 112 based on the master-time-signal, in order to provide a timestamped-processed-first-RF-signal 120. For instance, the first timestamp processor 118 can add the value of the master-time-signal 117 at the instant that the first timestamp processor 118 receives the processed-first-RF-signal 112 as the timestamp. In some examples, the timestamp can be included as metadata of the processed-first-RF-signal 112. In this way, the first timestamp processor 118 can tag sample streams with absolute time information.

In this example, the first timestamp processor 118 includes a calculator 119 that calculates a time alignment as well as the timestamp. The first timestamp processor 118 also includes a time alignment block 124. The calculator 119 can provide the functionality of a time alignment extraction unit, in that it can compare the time information of the input streams (derived from the first RF signal) against the master-time-signal 117 (i.e. the processing system's master time). The time alignment block 124 can then adjust the processed-first-RF-signal 112 (in this example digitized radio frequency baseband sample streams) against the master-time-signal 117. Advantageously, the resolution of the master-time-signal 117 is sufficient for the time alignment block 124 to perform sub-sample time alignment. That is, the time alignment block 124 can perform sub-sample grid based adjustment for the processing chain of the first unit 102.

The first unit 102 further includes a first interface 122 for communicating with the one or more second units 104, 106. The first interface 122 of the first unit 102 may communicate directly with each of the second units 104, 106, or indirectly with one or more of the second units 104, 106. In the example of FIG. 1, the first interface 122 communicates directly with the second unit 104 that is labelled as "System Unit 2" and indirectly with the second unit 106 that is labelled as "System Unit x" (as well as any intermediate units that are located between "System Unit 2" 104 and "System Unit x" 106.

The first interface 122 receives timestamped-processed-second-RF-signals from the one or more second units 104, 106. The timestamped-processed-second-RF-signals are similar to the timestamped-processed-first-RF-signal 120, and are expected to represent the same data as the timestamped-processed-first-RF-signal 120. In this way, the first unit 102 can combine the timestamped-processed-RF-signals received at different antennas to improve the quality and reliability of signal reception in any way that is known in the art.

As will be discussed in detail with reference to FIG. 2, the first interface 122 can provide a first-unit-timing-signal, that is based on the master-time-signal 117, to the one or more second units 104, 106. The first-unit-timing-signal can include one or more first-timing-values. The one or more first-timing-values can include one or both of: the value of the master-time-signal 117 when an earlier request-signal was received from the one or more second units 104, 106; and the value of the master-time-signal 117 when the first unit 102 transmitted an earlier first-unit-timing-signal to the one or more second units 104, 106. (Request-signals are described below.) In this way, the one or more second units 104, 106 can determine an offset between its local time-signal (which will be described below as a slave-time-signal 142) and the master-time-signal 117 of the first unit 102.

In this example, each of the second units 104, 106 are identical. Therefore, we will only describe one of the second units 104; the one that is labelled as "System Unit 2".

The second unit 104 include a second-antenna 136 that receives a second RF signal. As indicated above, the second RF signal is expected to represent the same data as the first RF signal, albeit potentially with higher or lower signal strength due to the different locations of the first-antenna 108 and the second-antenna 136.

The second unit 104 includes a second signal processing block 138 that can process the second RF signal in order to provide a processed-second-RF-signal 148. The second signal processing block 138 in this example includes the same components as the first signal processing block 110.

The second unit 104 further includes a slave time block 140 that receives the master-oscillator-signal from the oscillator 114 of the first unit 102. The slave time block 140 can receive the master-oscillator-signal via any communication link between the first unit 102 and the second unit 104, whether wired or wireless. In some examples, the slave time block 140 can receive the master-oscillator-signal at a second (high-speed) interface 146 of the second unit 104, which can be in communication with the first (high-speed) interface 122 of the first unit 102. The slave time block 140 determines a slave-time-signal for the second unit 104 based on the master-oscillator-signal. The slave-time-signal is illustrated schematically in FIG. 1 with reference 142.

The second unit 104 also includes a time adjuster 156. In this example the time adjuster 156 is illustrated as part of the slave time block 140. The time adjuster 156 determines one or more second-timing-values based on the slave-time-signal 142, and can then determine an adjustment-time based on the first-unit-timing-signal received from the first unit 102 and the second-timing-values. As will be discussed in detail below with reference to FIG. 2, the time adjuster 156 can determine the one or more second-timing-values by: storing the value of the slave-time-signal 142 when the second unit 104 sends a request-signal to the first unit 104; and/or storing the value of the slave-time-signal 142 when the second unit 104 receives a first-unit-timing-signal from the first unit 102.

The time adjuster 156 can then adjust the slave-time-signal 142 based on the adjustment-time, as will be discussed in more detail with reference with FIG. 2. For instance, as will be discussed below, the time adjuster 156 can add or subtract the adjustment-time to/from the master-oscillator-signal in order to adjust the slave-time-signal 142. In this way, the slave-time-signal 142 can be adjusted such that it is well-aligned with the master-time-signal 117 of the first unit 102.

In this example, the slave time block 140 includes a clock buffer 141 that receives and stores the master-oscillator-signal from the oscillator 114 of the first unit 102, such that the slave-time-signal 142 can be provided based on the stored/buffered master-oscillator-signal. The clock buffer 141 can have reference crystal quality reception and transmission capabilities, such that the resolution and accuracy of the slave-time-signal 142 can match the resolution and accuracy of the master-time-signal 117.

As shown in FIG. 1, any subsequent second units 106 can receive the master-oscillator-signal from an earlier second unit 104 in a chain of second units 104—in this example from the clock buffer 141 of an earlier second unit 104. In other examples, each second unit 104 can have a direct connection with the first unit 102 in order to directly receive the master-oscillator-signal.

The second unit 104 also includes a second timestamp processor 144 that can apply a timestamp to the processed-second-RF-signal 148 based on the slave-time-signal, in order to provide a timestamped-processed-second-RF-signal 150. In this example, the second timestamp processor 144 is implemented in the same way as the first timestamp processor 118 in that it includes a calculator 152 and a time alignment block 154.

The second unit 104 additionally includes a second interface 146 that provides the timestamped-processed-second-RF-signal 150 to the first unit 102. In this way, the first unit 102 can receive and combine the timestamped-processed-second-RF-signals 150 from the one or more second units 104 in any way known in the art. The second interface 146 also receives the first-unit-timing-signal from the first unit 102, such that the time adjuster 156 of the second unit 104 can use the first-unit-timing-signal to calculate the adjustment-time, as discussed in more detail below.

The system 100 of FIG. 1 can then provide the timestamped-processed-first-RF-signal 120 and the timestamped-processed-second-RF-signals 150 from the one or more second units 104 for further processing. Such further processing can be performed by components/modules of the system 100, as is the case in FIG. 1 as will be described below. Alternatively, the system 100 can simply provide the synchronized timestamped-processed-RF-signals 120, 150 as outputs of the system 100 such that they can be processed by a remote device.

In the example of FIG. 1, the further processing of the timestamped-processed-RF-signals 120, 150 is performed by a processor associated with the system 110. The processor in this example is a baseband processor 126 that is associated with the first unit infrastructure 102. The baseband processor 126 combines the timestamped-processed-first-RF-signal 120 and the timestamped-processed-second-RF-signals 150 from the one or more second units 104, 106 in order to provide a combined-RF-signal 158. For instance, the baseband processor 126 can implement a phase diversity system by combining the timestamped-processed-RF-signals using phase diversity. In this way, the baseband processor 126 can perform sample grid based adjustment per sample stream using time stamps.

The system 100 of FIG. 1 can be considered as a fully aligned sampling system, which includes the exchange of master and local time stamps between units in the system to enable precision time information exchange. The system 100 can also involve an adjustment of a local clock against a master clock, a sub-sample grid based adjustment per processing chain using local and master clock information, and a sample grid based adjustment per sample stream using time stamps.

The first interface 122 and the second interface 146 can be high-speed interfaces having a structure (to limit system connection resources) that supports a precision time measurement and a transmission protocol for digitized radio frequency baseband samples including timestamps. Advantageously the first and second interfaces 122, 146 can be standard high-speed interfaces—that is, they may not be proprietary interfaces. This can greatly assist the ease with which the system 100 of FIG. 1 can be implemented. In some applications, it can be straightforward to include the timestamps and timing information that are disclosed herein with the processed RF signals that are exchanged between the units 102, 104, 106 to implement the improved system of FIG. 1.

Advantageously, the time resolution of the master-time-signal 117 (that is provided by the master time block 116) is the same as the time resolution of the slave-time-signal 142 (that is provided by the slave time block 140). This can ensure that any time alignment that is performed at the first and second units 102, 104, 106 has the same resolution. It can also ensure that the timestamps that are provided by each of the first and second units 102, 104, 106 have the same resolution.

Figure 2:
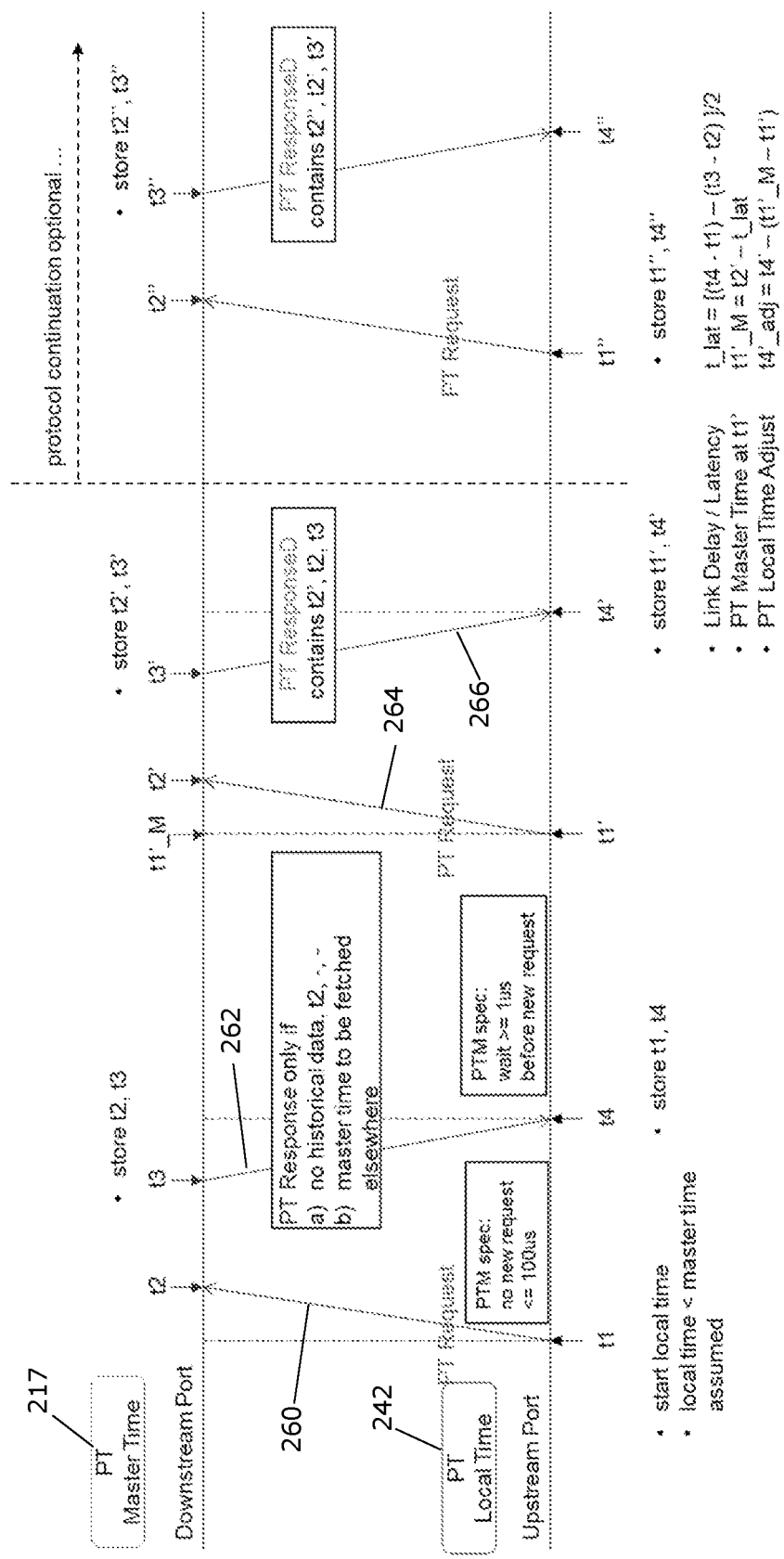
FIG. 2 shows a timing diagram that illustrates how timing information can be exchanged between the first unit and a second unit of FIG. 1.

FIG. 2 shows a timing diagram that illustrates how timing information can be exchanged between the first unit and a second unit of FIG. 1. FIG. 2 illustrates an example of a precision time protocol, which is implemented using a request and response messaging system.

A downstream port of the first interface of the first unit is represented at the top of FIG. 2, with the master-time-signal 217 providing the timing information for the timestamps/timing-values that are provided by the first unit. In FIG. 2 the master-time-signal 217 is labelled as a precision time (PT) master time.

An upstream port of the second interface of a second unit is represented at the bottom of FIG. 2, with the slave-time-signal 242 providing the timing information for the timestamps/timing-values that are provided by the second unit. In FIG. 2 the slave-time-signal 242 is labelled as a precision time (PT) local time. In this example, for the calculations that are to follow, the slave-time-signal 242 is assumed to be less than the master-time-signal 217. Although it will be appreciated that it will be straightforward to adjust the calculations if this is not the case, or for the second unit to offset the value of the slave-time-signal such that it is less than the master-time-signal 217.

As will now be discussed, the downstream port of the first interface and the upstream port of the second interface exchange messages such that the slave-time-signal 242 can be adjusted so that it is better aligned with the master-time-signal 217. This includes the downstream port of the first interface sending the first-unit-timing-signal (that is introduced with reference to FIG. 1) to the upstream port of the second interface.

A first request-signal 260 is shown in FIG. 2, which is sent by the second unit to the first unit. In some examples the first request-signal is provided as part of a control flow that is separate to the delivery of processed RF signals that are received at the second unit. The second unit stores the time that the first request-signal 260 is transmitted as a second-timing-value, t1. The second-timing-value, t1, is the value of the slave-time-signal 242 (i.e. the local time at the second unit) when the second unit transmitted the request-signal. This first request-signal 260 can be considered in this context as a precision time (PT) request.

In response to the first request-signal 260, the first unit sends a first first-unit-timing-signal 262 back to the second unit. The first-unit-timing-signal includes the following information (although not all of it is available for the first first-unit-timing-signal 260):

$t2^{n-1}$, which is the value of the master-time-signal 217 at the time that an earlier request-signal was received from the second unit;

$t2^n$, which is the value of the master-time-signal 217 at the time that the most recent request-signal was received from the second unit; and $t3^{n-1}$, which is the value of the master-time-signal 217 at the time (t3) when the first unit transmitted an earlier first-unit-timing-signal to the second unit.

Here, 'n' is used to signify a current PT request-signal and first-unit-timing-signal pair, and 'n-1' is used to signify the preceding PT request-signal and first-unit-timing-signal pair such that the relative timings of the signals in the timing diagram can be identified. In the drawing, each PT request-signal and first-unit-timing-signal pair is labelled with an increasing number of primes to signify the absolute position of the signals in the timing diagram.

For the first first-unit-timing-signal 262, the values of $t2^{n-1}$ and $t3^{n-1}$ are not available to be sent as part of the first-unit-timing-signal 262. Therefore, the first first-unit-timing-signal 262 can only include $t2^n$.

Having sent the first first-unit-timing-signal 262, the first unit stores:

$t2^n$, which is the value of the master-time-signal 217 at the time (t2) that the most recent request-signal was received from the second unit; and $t3^n$, which is the value of the master-time-signal 217 at the time (t3) when the first unit transmitted the most recent first-unit-timing-signal 262 to the second unit.

In response to receiving the first first-unit-timing-signal 262, the second unit stores:

$t1^n$, which is the value of the slave-time-signal 242 at the time (t1) when the second unit transmitted the most recent timestamped-processed-second-RF-signal (the first request-signal 260);

$t4^n$, which is the value of the slave-time-signal 242 at the time (t4) when the second unit received the current first-unit-timing-signal (the first first-unit-timing-signal 262) from the first unit; and $t2^n$, which has been received from the first unit as part of the first first-unit-timing-signal and is the value of the master-time-signal 217 at the time (t2) that the most recent request-signal was received from the second unit.

The first (PT) request-signal 260 and response message (i.e. the first first-unit-timing-signal 262) in this example are used by the upstream port of the second unit to check if the downstream port of the first unit supports a precision time protocol, and also to store the timing-values/timestamps that are described above. That is, from start to end of the messaging, and to receive the downstream port's initial time stamp.

We will now move on to the second PT request-signal and first-unit-timing-signal pair (signals labelled as 264, 266). The timings of these signals are labelled as t1'-4' in FIG. 2, and will now be referred to as t1-4″ to reflect that they are the timings of the current signals. The timings of the first signals (signals labelled as 260, 262) will be referred to as $t1^{n-1}$-$4^{n-1}$ to reflect that they are the timings of the preceding pair of signals.

The second request-signal 264 that is shown in FIG. 2, which can be embodied as a second instance of a time-stamped-processed-second-RF-signal, is sent by the second unit to the first unit. The second unit stores the time that the second request-signal 264 is transmitted as t1″ (t1' in the drawing), according to the slave-time-signal 242 (i.e. the local time at the second unit).

In response to the second request-signal 264, the first unit sends a second first-unit-timing-signal 266 back to the second unit. The second first-unit-timing-signal 264 includes:

$t2^{n-1}$ (t2 in the drawing), which is the value of the master-time-signal 217 at the time that an earlier request-signal was received from the second unit;

$t2″$ (t2' in the drawing), which is the value of the master-time-signal 217 at the time that the most recent request-signal was received from the second unit; and $t3^{n-1}$ (t3 in the drawing), which is the value of the master-time-signal 217 at the time when the first unit transmitted an earlier first-unit-timing-signal to the second unit.

Having sent the second first-unit-timing-signal 266, the first unit stores:

$t2″$, which is the value of the master-time-signal 217 at the time (t2') that the most recent request-signal was received from the second unit; and $t3″$, which is the value of the master-time-signal 217 at the time (t3') when the first unit transmitted the most recent first-unit-timing-signal 262 to the second unit.

In response to receiving the second first-unit-timing-signal 266, the second unit stores:

$t1″$, which is the value of the slave-time-signal 242 at the time (t1') when the second unit transmitted the most recent timestamped-processed-second-RF-signal (the second request-signal 260);

$t4″$, which is the value of the slave-time-signal 242 at the time (t4') when the second unit received the current first-unit-timing-signal (the second first-unit-timing-signal 262) from the first unit;

$t2″$, which has been received from the first unit as part of the second first-unit-timing-signal and is the value of the master-time-signal 217 at the time (t2') that the most recent timestamped-processed-second-RF-signal was received from the second unit; and $t3^{n-1}$, which has been received from the first unit as part of the second first-unit-timing-signal and is the value of the master-time-signal 217 at the time (t3) that the most recent timestamped-processed-second-RF-signal was received from the second unit.

The second (PT) request-signal 264 and response message (the second first-unit-timing-signal 266) are used to retrieve two historical time stamps for the first message (t2 and t3) and the actual downstream port timestamp at the request message received point in time (t2').

The second unit now has a complete set of timing information ($t1^{n-1}$, $t2^{n-1}$, $t3^{n-1}$, $t4^{n-1}$) for the earlier PT first-timing-signal and first-unit-timing-signal pair (the timings labelled as t1-t4 in the drawing). The second unit (and more particularly the time adjuster of the second unit in some examples) can determine the adjustment-time based on $t1^{n-1}$, $t2^{n-1}$, $t3^{n-1}$, $t4^{n-1}$. That is, the second unit can determine an amount that the slave-timing—signal should be adjusted by such that the timestamps that are applied to the processed-first-RF-signal and the processed-second-RF-signal are accurately aligned. Accurately aligning these timestamps can enable the signals to be accurately processed both at a sample grid level (in the example of FIG. 1 by the baseband processor) and at the sub-sample grid level (in the example of FIG. 1 by the time alignment blocks).

In the example of FIG. 2 it is assumed that a symmetrical TX/RX high speed serial interface is used to communicate the signals between the downstream port of the first unit and the upstream port of the second unit, such that the link latency can be calculated by dividing the differences between (t4−t1)−(t3−t2) by a factor of 2. That is:

Link Delay/Latency: $t\_lat=[(t4-t1)-(t3-t2)]/2$

It will be appreciated that an unsymmetrical interface connection can be mitigated against by measuring the fixed delays in the system's application, and then adding them as configuration parameters to the system.

Based on the determined link latency (t_lat), the value of the master-time-signal at the downstream port of the first unit when the second request-signal 264 was sent by the second unit can be determined at the second unit using the received time stamp t2' and the calculated link latencies including protocol delays (t_lat):

PT Master Time at $t1'$: $t1'\_M=t2'\_t\_lat$

In turn, the adjustment-time (t4'_adj) can be calculated as:

PT Local Time Adjust: $t4'\_adj=t4'-(t1'\_M-t1')$

In this way, the adjustment-time (t4'_adj) represents the amount that the slave-time-signal 242 is offset from the master-time-signal 217. The second unit can then use the determined adjustment-time (t4'_adj) to update the slave-time-signal 242 (e.g. to add or subtract an offset based on the adjustment-time (t4'_adj)) such that the value of adjustment-time (t4'_adj) is reduced for a subsequent iteration. (A subsequent iteration is illustrated schematically on the right-hand side of FIG. 2, with timing-values labelled with double primes (e.g. t1"), under the heading "protocol continuation optional". It will be appreciated that such further iterations are not essential, although is some applications they may serve to increase the accuracy of the determined adjustment-time, especially if an offset between the master-timing-signal and the slave-time-signal varies over time.

It will be appreciated that the calculations that are identified above are just one of many ways in which the adjustment-time can be calculated based on the various timings that are stored or communicated.

Figure 3:
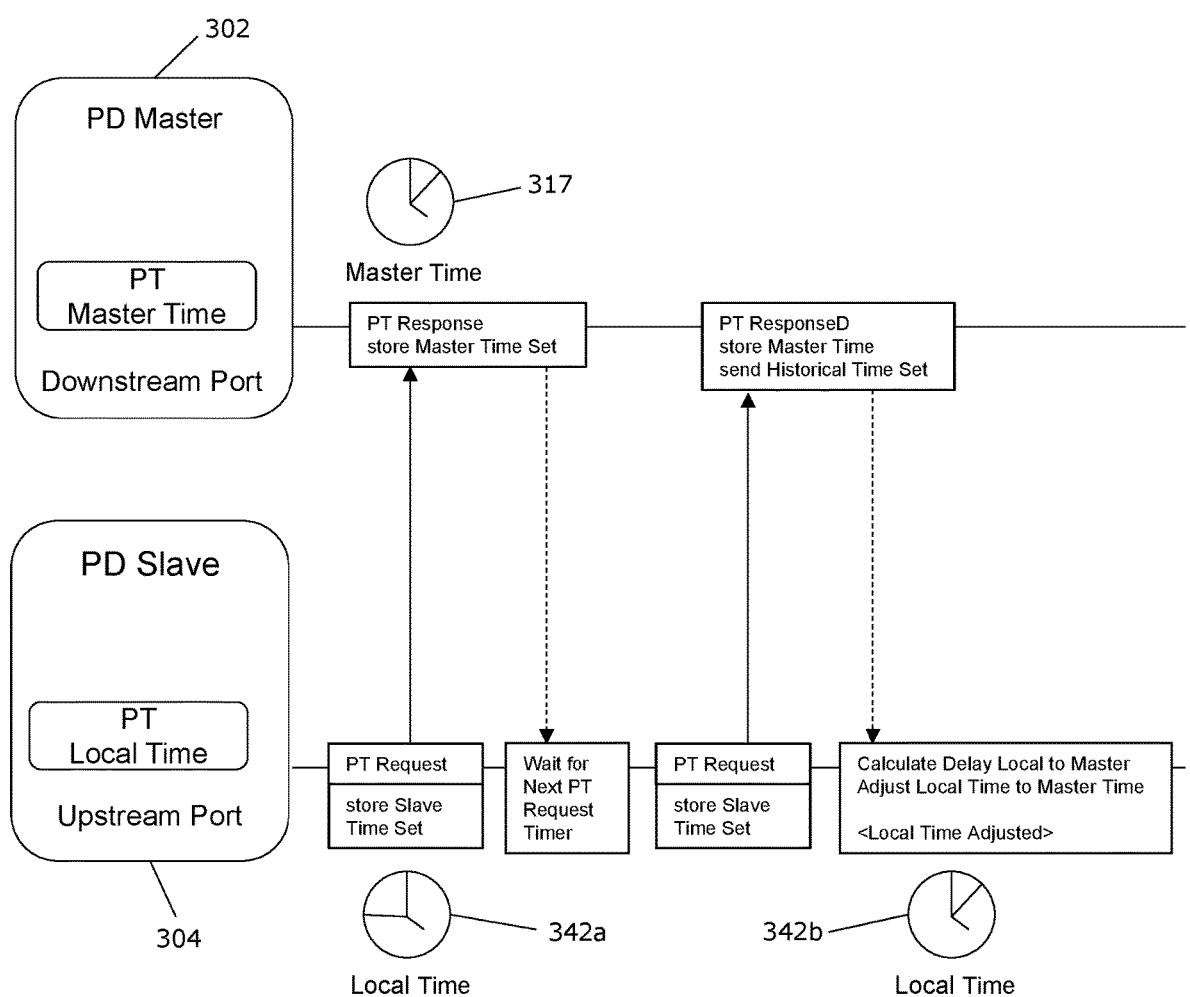
FIG. 3 provides another schematic illustration of clock alignment, that provides an overview of the timing diagram of FIG. 2.

FIG. 3 provides another schematic illustration of clock alignment, that provides an overview of the timing diagram of FIG. 2. In FIG. 3, the first unit of FIG. 1 is illustrated as a PD (phase diversity) Master 302 and the second unit of FIG. 1 is illustrated as a PD (phase diversity) Slave 304. The master-time-signal 317 is illustrated schematically with reference to the PD Master 302. A first value of the slave-time-signal 342a, before the adjustment-time has been calculated and applied, is illustrated schematically with reference to the PD Slave 304. A second value of the slave-time-signal 342b, after the adjustment-time has been calculated and applied, is illustrated schematically as having a different value to the slave-time-signal 342a before adjustment.

Advantageously, the processing that is described and illustrated with reference to FIGS. 2 and 3 utilises the shared reference signal (the master-oscillator-signal) and the high precision master and local clocks (master-time-signal and slave-time-signal) to process time aligned samples. In some applications, an absolute time reference mismatch well below 100 ns can be achieved. The absolute precision of such a system is of course affected by implementation details such as circuit clock speed and timer bit resolution, which should be tailored to the envisaged application of the system.

Applications of the system described herein include a (sub-sample) time alignment block (as described with reference to FIG. 1) that enables challenging timestamp-based applications such as phase diversity processing for analog broadcast systems using two or more antenna input signals to be implemented. A significant purpose of the time alignment block unit is to align all processing streams upfront on a higher than final sample grid processing base, and thus enabling a precise time alignment below the required threshold for the envisaged application.

Figure 4:
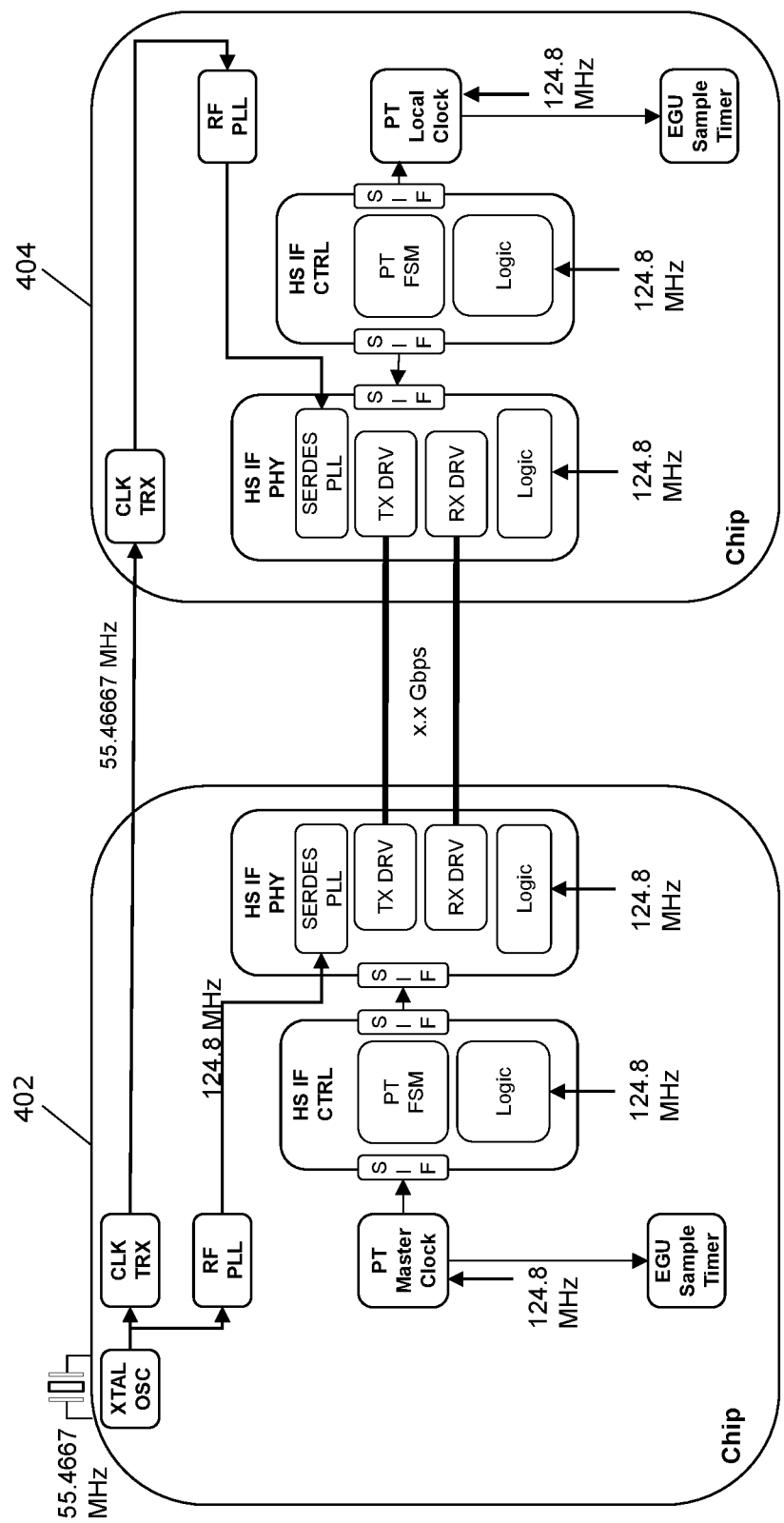
FIG. 4 shows an example implementation of an integrated circuit (IC) associated with a first unit and an integrated circuit (IC) associated with a second unit.

FIG. 4 shows an example implementation of an integrated circuit (IC) associated with a first unit 402 and an integrated circuit (IC) associated with a second unit 404. This example implementation is provided to demonstrate the achievable precision based on known or measured system latencies.

The two ICs 402, 404 each incorporate a high speed interface (HS IF CTRL and PHY), a master or local clock unit (respectively) and two enable generation units (EGU) for precise sub-sample grid processing stream alignment.

The fixed delays in such a system can be:
the PT protocol master finite state machine,
the PT protocol slave finite state machine,
the high speed interface link delay which can be determined by timestamp calculation in case of a symmetrical connection or by measurement in the application.

The variable delays can be caused by design related circuit domain boundaries and the master or local clocks resolution limitations. In this example, and due to a fairly synchronous circuit operation, the remaining variable delays are:
the resolution of the PT master and PT local clock when compensating for the fixed delays,
the jitter related to the RF phase locked loop (PLL),
the PT master and local clocks timer being sampled the EGU sample timer.

The PT master and local clocks are represented by timer circuits operating at $f_{circuit}$=124.8 MHz which limits any fixed delay compensation and adjustments to a maximum resolution of around 8 ns. The jitter introduced by a high speed interface reference PLL (RF PLL) is usually small and well below 1 ns. Both master as well as the local PT clock are being transferred into the EGU sample timer processing domains which run at $f_{circuit}$=166.4 MHz. This results in a domain crossing sampling uncertainty including sampling effects recovery of around 2*6 ns.

The overall worst-case deviation between the processing streams then sums up to around 21 ns. Considering an absolute timing mismatch of below 100 ns as appropriate for phase diversity processing system, this example implementation leaves more than enough headroom for even less synchronous implementations at reasonable circuit design operation speed.

One example application that is suitable for the examples that are described herein, which includes a high speed interface, is Peripheral Component Interconnect Express (PCIe) and its related PTM (precision time measurement) protocol as described in an ECN (engineering change notice) added to PCIe base spec 3.0 and fully embedded into the PCI Express® Base Specification Revision 3.1a Dec. 7, 2015.

By using a standardized precise time-sharing mechanism over a high speed serial interface, as provided by examples disclosed herein, it is possible to achieve a representation of absolute time across several system components/units while staying within the elements of standard interface technologies.

Beneficially, examples disclosed herein can enables digital signal processing (DSP) software to satisfactorily achieve sub-sample and sample alignment as required for phase diversity processing in a straightforward manner. The adjustment of master and/or local time using the same shared crystal-based reference signals can establish a robust and stable time-base throughout all system application components/units.

Aspects of the present disclosure can include:
- usage of a high speed interface based precision time information sharing mechanism in phase diversity processing for multiple antenna configuration in analog radio reception systems,
- usage of a shared reference signal for master and local time generation in a distributed broadcast processing system application,
- introduction of a master and a local time scheme which uses exactly the same granularity/time resolution to enable combining different antenna signals, and
- adjustment of a distributed broadcast processing system to an absolute time base.

Advantageously, examples disclosed herein do not rely on a specialized vendor specific implementations for the exchange of absolute time information in broadcast applications. Instead a standard interface can be used to exchange the time information, for example by exchanging time-stamps/timing-values as request-signals and first-unit-timing-signals. The request-signals and/or the first-unit-timing-signals can be provided as metadata, thereby advantageously enabling standard interfaces to the used. Furthermore, interface latencies do not need to be captured in an adjustment or calibration-like fashion. This is because systems disclosed herein can exchange time information (for example using an exchange protocol like PCIe PTM) in order to allow for automatic latency adjustment.

One or more of the examples disclosed herein: can use high speed interface precise time sharing for broadcast related applications; can use precise time sharing in combination with a high precision reference signal within a distributed system; and can include a sub-sample alignment mechanism based on transmitted precise master time information and the usage of local clock information including high speed interface introduced system latency without any calibration needs.

Examples disclosed herein can be used as part of a broadcast tuner system for automotive entertainment applications. Due to several factors like e.g. car design aspects, the broadcast reception antennas are moving to less technically advantageous positions in today's car design. Therefore, combining the signal of two or more antennas in a phase diversity processing can be particularly important for many car manufacturers. Furthermore, very tight timing requirements can apply such that processing with precise sub-sample and sample time alignment in those systems can be a key enabler for these kinds of applications. By using standardized interfaces and protocols for the necessary alignment steps, it is possible to build such challenging real-time critical application on reliable and well-known interface technologies.

Disclosed herein is a system that can align digitized broadcast signals with different antenna origins for subsequent phase diversity processing. It can allow for a signal adjustment on sub-sample and sample time granularity using a high-speed interface based time stamping approach and calibration-free reference signals as an origin for master and local clock alignments. The system can be used in consumer as well as automotive broadcast receiver system applications and is scalable towards multiple antenna configurations.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A system comprising:
a first unit; and
one or more second units;
wherein the first unit comprises:
a first-antenna configured to receive a first RF signal;
a first signal processing block configured to process the first RF signal in order to provide a processed-first-RF-signal;
a timing reference configured to provide a master-timing-reference-signal;
a master time block configured to provide a master-time-signal for the first unit based on the master-timing-reference-signal;
a first timestamp processor configured to apply a timestamp to the processed-first-RF-signal based on the master-time-signal, in order to provide a timestamped-processed-first-RF-signal;
a first interface configured to:
receive timestamped-processed-second-RF-signals from the one or more second units; and
provide a first-unit-timing-signal to the one or more second units based on the master-time-signal;
wherein the one or more second units each comprise:
a second-antenna configured to receive a second RF signal;
a second signal processing block configured to process the second RF signal in order to provide a processed-second-RF-signal;
a slave time block configured to:
receive the master-timing-reference-signal;
determine a slave-time-signal for the second unit based on the master-timing-reference-signal;
determine one or more second-timing-values based on the slave-time-signal;
determine an adjustment-time based on the first-unit-timing-signal received from the first unit and the second-timing-values; and
adjust the slave-time-signal based on the adjustment-time;
a second timestamp processor configured to apply a timestamp to the processed-second-RF-signal based on the slave-time-signal, in order to provide a timestamped-processed-second-RF-signal; and
a second interface configured to:
provide the timestamped-processed-second-RF-signal to the first unit; and
receive the first-unit-timing-signal from the first unit;
wherein the system is configured to provide a combined-RF-signal by combining the timestamped-processed-first-RF-signal and the timestamped-processed-second-RF-signals from the one or more second units for further processing.

2. The system of claim 1, wherein the system further comprises a processor that is configured to combine the timestamped-processed-first-RF-signal and the timestamped-processed-second-RF-signals from the one or more second units in order to provide the combined-RF-signal.

3. The system of claim 2, wherein the processor is a baseband processor.

4. The system of claim 2, wherein the processor is configured to combine the timestamped-processed-first-RF-signal and the timestamped-processed-second-RF-signals from the one or more second units in order to provide the combined-RF-signal using phase diversity.

5. The system of claim 1, wherein the slave time block is configured to determine the one or more second-timing-values by: storing the value of the slave-time-signal when the second unit sends a request-signal to the first unit; and/or storing the value of the slave-time-signal when the second unit receives the first-unit-timing-signal from the first unit.

6. The system of claim 1, wherein the first-unit-timing-signal comprises one or more first-timing-values that include one or both of: the value of the master-time-signal when an earlier request-signal was received from the one or more second units; and the value of the master-time-signal when the first unit transmitted an earlier first-unit-timing-signal to the one or more second units.

7. The system of claim 1, wherein the slave time block is configured to add/subtract the adjustment-time to/from the master-timing-reference-signal in order to adjust the slave-time-signal.

8. The system of claim 1, wherein: the first-unit-timing-signal that is provided by the first unit comprises:
t2, which is the value of the master-time-signal at the time (t2) that an earlier request-signal was received from the one or more second units; and
t3, which is the value of the master-time-signal at the time (t3) when the first unit transmitted an earlier first-unit-timing-signal to the one or more second units;
each of the one or more second units is configured to:
store t1 as a second-timing-value, wherein t1 is the value of the slave-time-signal at the time when the second unit transmitted the earlier request-signal; and
store t4 as a second-timing-value, wherein t4 is the value of the slave-time-signal at the time when the second unit received the earlier first-unit-timing-signal from the first unit; and
the slave-time-block is configured to determine the adjustment-time based on t1, t2, t3 and t4.

9. The system of claim 1, wherein the first and second interfaces are high-speed interfaces.

10. The system of claim 9, wherein the high-speed interfaces are standard high-speed interfaces.

11. The system of claim 1,
wherein: the first unit comprises a time alignment block that is configured to adjust the processed-first-RF-signal using the master-time-signal to perform sub-sample time alignment; and
the second unit comprises a time alignment block that is configured to adjust the processed-second-RF-signal using the slave-time-signal to perform sub-sample time alignment.

12. The system of claim 1, wherein: the first timestamp processor is configured to apply the timestamp to the processed-first-RF-signal as metadata; and
the second timestamp processor is configured to apply the timestamp to the processed-second-RF-signal as metadata.

13. The system of claim 1, wherein the master-timing-reference-signal has a maximum deviation from a target frequency/time period of +/−50 ppm.

14. The system of claim 1, wherein the master-time-signal and the slave-time-signal have the same resolution.

15. A method comprising:
in relation to a first unit:
receiving a first RF signal;
processing the first RF signal in order to provide a processed-first-RF-signal;
a timing reference providing a master-timing-reference-signal;
providing a master-time-signal for the first unit based on the master-timing-reference-signal;

applying a timestamp to the processed-first-RF-signal based on the master-time-signal, in order to provide a timestamped-processed-first-RF-signal;
receiving timestamped-processed-second-RF-signals from the one or more second units; and
providing a first-unit-timing-signal to the one or more second units based on the master-time-signal;
in relation to one or more second units:
receiving a second RF signal;
processing the second RF signal in order to provide a processed-second-RF-signal;
receiving the master-timing-reference-signal;
determining a slave-time-signal for the second unit based on the master-timing-reference-signal;
determining one or more second-timing-values based on the slave-time-signal;
determining an adjustment-time based on the first-unit-timing-signal received from the first unit and the second-timing-values; and
adjusting the slave-time-signal based on the adjustment-time;
applying a timestamp to the processed-second-RF-signal based on the slave-time-signal, in order to provide a timestamped-processed-second-RF-signal;
providing the timestamped-processed-second-RF-signal to the first unit; and
receiving the first-unit-timing-signal from the first unit;
the method further comprising:
providing a combined-RF-signal by combining the timestamped-processed-first-RF-signal and the timestamped-processed-second-RF-signals from the one or more second units for further processing.

16. A method comprising:
receiving a first RF signal at a first unit;
processing the first RF signal in order to provide a processed-first-RF-signal;
providing a master-time-signal for the first unit based on a master-timing-reference-signal;
applying a first timestamp to the processed-first-RF-signal based on the master-time-signal in order to provide a timestamped-processed-first-RF-signal;
receiving timestamped-processed-second-RF-signals from the one or more second units;
providing a first-unit-timing-signal to the one or more second units based on the master-time-signal;
receiving a second RF signal at a second unit;
processing the second RF signal in order to provide a processed-second-RF-signal;
determining a slave-time-signal for the second unit based on the master-timing-reference-signal;
determining one or more second-timing-values based on the slave-time-signal;
determining an adjustment-time based on the first-unit-timing-signal received from the first unit and the second-timing-values; and
adjusting the slave-time-signal based on the adjustment-time;
applying a second timestamp to the processed-second-RF-signal based on the slave- time-signal in order to provide a timestamped-processed-second-RF-signal; and
providing the timestamped-processed-second-RF-signal to the first unit,
wherein the method further comprises combining the timestamped-processed-first-RF-signal and the timestamped-processed-second-RF-signal in order to provide, by the first unit, a combined-RF-signal for further processing.

17. The method of claim 16, further comprising combining the timestamped-processed-first-RF-signal and the timestamped-processed-second-RF-signal in order to provide the combined-RF-signal using phase diversity.

18. The method of claim 16, wherein determining the one or more second-timing-values further comprises storing the value of the slave-time-signal when the second unit sends a request-signal to the first unit and/or when the second unit receives the first-unit-timing-signal from the first unit.

19. The method of claim 16, further comprising adding the adjustment-time to/from the master-timing-reference-signal in order to adjust the slave-time-signal or subtracting the adjustment-time to/from the master-timing-reference-signal in order to adjust the slave-time-signal.

* * * * *